(12) United States Patent
Gasworth

(10) Patent No.: US 10,889,085 B2
(45) Date of Patent: Jan. 12, 2021

(54) PLASTIC ASSEMBLY, METHODS OF MAKING AND USING THE SAME, AND ARTICLES COMPRISING THE SAME

(71) Applicant: Steven Marc Gasworth, Novi, MI (US)

(72) Inventor: Steven Marc Gasworth, Novi, MI (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 13/904,372

(22) Filed: May 29, 2013

(65) Prior Publication Data

US 2013/0323481 A1   Dec. 5, 2013

Related U.S. Application Data

(60) Provisional application No. 61/653,004, filed on May 30, 2012.

(51) Int. Cl.
  *B32B 7/12*  (2006.01)
  *B32B 7/02*  (2019.01)
  *B60J 1/00*  (2006.01)

(52) U.S. Cl.
  CPC ............ *B32B 7/12* (2013.01); *B32B 7/02* (2013.01); *B60J 1/006* (2013.01); *Y10T 428/24942* (2015.01); *Y10T 428/31507* (2015.04)

(58) Field of Classification Search
  CPC . B32B 2369/00; B32B 2605/00; B32B 27/06; B32B 27/08; B32B 27/16;
  (Continued)

(56) References Cited

U.S. PATENT DOCUMENTS 4,252,391 A * 2/1981 Sado .............................. 439/91
4,565,684 A   1/1986 Tibbetts et al.
(Continued)

FOREIGN PATENT DOCUMENTS

EP   2218577 A1   8/2010
JP   H06333965 A   12/1994
(Continued)

OTHER PUBLICATIONS

Engineer's Toolbox "Coefficients of Linear Thermal Expansion" retrieved Feb. 2019 (Year: 2019).*
(Continued)

*Primary Examiner* — Frank J Vineis
*Assistant Examiner* — Laura B Figg
(74) *Attorney, Agent, or Firm* — Cantor Colburn LLP

(57) ABSTRACT

In an embodiment, a vehicle component comprises a thermoplastic element having a thermoplastic element first surface and a thermoplastic element second surface; a structural element defining an opening, wherein the structural element has a structural element first surface and a structural element second surface, wherein the thermoplastic element is in the opening; and an elastic anisotropic bonding element between the thermoplastic element second surface and the structural element first surface. In an embodiment, a method of forming a plastic assembly comprises forming an anisotropic bonding element comprising a layer comprising a bonding element matrix without elongated members, a layer comprising a bonding element matrix comprising elongated members, and a layer comprising a bonding element matrix without elongated members; attaching the anisotropic bonding element to a structural element and a thermoplastic element, wherein the anisotropic bonding element is between a thermoplastic element second surface and a structural element first surface.

23 Claims, 3 Drawing Sheets

(58) Field of Classification Search
CPC .......... B32B 27/28; B32B 27/36; B32B 3/00;
B32B 3/02; B32B 3/26; B32B 5/00;
B32B 5/02; B32B 7/00; B32B 7/02;
B32B 7/04; B32B 7/10; B32B 7/12;
B32B 2250/00; B32B 2250/40; B32B
2307/30
USPC ......................................................... 428/212
See application file for complete search history.

(56) References Cited

U.S. PATENT DOCUMENTS

| | | | |
|---|---|---|---|
| 4,572,813 | A | 2/1986 | Arakawa |
| 4,663,230 | A | 5/1987 | Tennent |
| 4,816,289 | A | 3/1989 | Komatsu et al. |
| 4,876,078 | A | 10/1989 | Arakawa et al. |
| 5,024,818 | A | 6/1991 | Tibbetts et al. |
| 5,165,909 | A | 11/1992 | Tennent et al. |
| 5,451,465 | A | 9/1995 | Garrioch |
| 5,589,152 | A | 12/1996 | Tennent et al. |
| 5,591,382 | A | 1/1997 | Nahass et al. |
| 5,665,450 | A * | 9/1997 | Day ..................... B29C 70/086 428/114 |
| 6,240,676 | B1 | 6/2001 | Cornils et al. |
| 6,270,910 | B1 * | 8/2001 | Jaeger .................... B32B 27/16 428/474.4 |
| 8,866,590 | B2 | 10/2014 | Wolf et al. |
| 2002/0044111 | A1 * | 4/2002 | Yamazaki et al. ............... 345/83 |
| 2003/0092327 | A1 | 5/2003 | Itagaki et al. |
| 2004/0094264 | A1 | 5/2004 | Yamaguchi et al. |
| 2005/0247822 | A1 * | 11/2005 | Salmon ................. B29C 70/763 244/129.3 |
| 2006/0054277 | A1 | 3/2006 | Byun et al. |
| 2006/0103044 | A1 | 5/2006 | Cate et al. |
| 2006/0131928 | A1 | 6/2006 | Onizawa et al. |
| 2006/0204746 | A1 | 9/2006 | Li et al. |
| 2007/0028695 | A1 | 2/2007 | Suzuki et al. |
| 2007/0286966 | A1 | 12/2007 | Chen et al. |
| 2008/0001429 | A1 * | 1/2008 | Willis .................... B29C 70/305 296/181.2 |
| 2009/0056246 | A1 | 3/2009 | Prince et al. |
| 2009/0117378 | A1 * | 5/2009 | Hu et al. ....................... 428/354 |
| 2009/0281268 | A1 * | 11/2009 | Rukavina ............ B32B 17/1077 528/60 |
| 2010/0112317 | A1 | 5/2010 | Gasworth et al. |
| 2011/0127809 | A1 | 6/2011 | Uehara |

FOREIGN PATENT DOCUMENTS

| | | |
|---|---|---|
| JP | 2002192056 A | 7/2002 |
| JP | 2002327165 A | 11/2002 |
| JP | 2004359220 A | 12/2004 |
| JP | 2011132389 A | 7/2011 |

OTHER PUBLICATIONS

E.S. Anand et al. "Role of adhesives in the dimensional stability of polycarbonate structural panels" International Journal of Adhesion & Adhesives (27) pp. 338-350.

M. Krois et al. "Use of compliant adhesive layers in direct glazing of road vehicles for improved sound attenuation" International Journal of Adhesion & Adhesives (2003) 413-425; IABG, Einsteinstrabe 20, Ottobrunm 85521, Germany; Institute of Bonding and Joining, Brunswick University, Langer Kamp 8, Brunswick 38106, Germany; SIKA AG, Tuffenwies 16-22, Zurich 8048, Switzerland; Accepted May 18, 2002 (www.elsevier.com/locate/ijadhadh).

International Search Report for International Application No. PCT/US2013/043034, Application Filing Date May 29, 2013; dated Aug. 26, 2013, 6 pages.

Written Opinion for International Application No. PCT/US2013/043034, International Application Filing Date: May 29, 2013; dated Aug. 26, 2013; 7 pages.

Chawla, Krishan K., "Composite Materials, Science and Engineering", Springer-Verlag, New York, 1987, Chapter 10, pp. 177-203.

Japanese Patent No. 2002192056; Date of Publication: Jul. 10, 2002; Abstract Only; 2 pages.

Japanese Patent No. 2002327165; Date of Publication: Nov. 15, 2002; Abstract Only; 1 page.

Japanese Patent No. H06333965; Date of Publication: Dec. 2, 1994; Abstract Only; 1 page.

Japanese Patent No. 2004359220; Date of Publication: Dec. 24, 2004; Abstract Only; 1 page.

Japanese Patent No. 2011132389; Date of Publication: Jul. 7, 2011; Abstract Only; 1 page.

* cited by examiner

PLASTIC ASSEMBLY, METHODS OF MAKING AND USING THE SAME, AND ARTICLES COMPRISING THE SAME

CROSS REFERENCE OF RELATED APPLICATIONS

The present application claims the benefit of Provisional Application Ser. No. 61/653,004, filed May 30, 2012 the contents of which are incorporated herein.

TECHNICAL FIELD

Disclosed herein is a plastic assembly, articles comprising the plastic assembly, and methods for making and using the same.

BACKGROUND

Polymeric (e.g., polycarbonate) automotive glazing (e.g., window) compared to glass, offers several advantages related to weight, impact resistance, thermal insulation, design flexibility, and integration opportunity. But, the use of polymeric based glazing materials in automotive applications raises problems, due in part, to the unique challenges posed by automotive service conditions. Such conditions include extreme temperatures and environmental exposure; intense and prolonged vibrational forces transmitted through the glazing material during normal operation of the automobile; occasional instances of intense shock and impact loads which may be randomly exerted on the glazing material; scratching of the surface by incidental contacts such as by washing the vehicle or impact of dust and other particles; and routine, prolonged exposure to environmental factors such as rain and ultraviolet and infrared radiation in sunlight.

Another disadvantage of using polycarbonate is that it has a larger coefficient of thermal expansion than glass, resulting in a larger mismatch in thermal expansion relative to the vehicle frame to which the glazing is attached. Such mismatch leads to differential expansion or differential contraction between the glazing (e.g., a rooflite) and the frame as the glazing temperature rises above or falls below the moderate temperature that prevailed when the glazing was attached. Such differential dimensional changes generally have several undesirable effects, including noticeable out-of-plane deflection of the glazing (e.g., formation of a dome or bubble shape), and in-plane deformation tending to modulate the width of the gap between the glazing and the vehicle surface.

For a given rooflite shape, out-of-plane deflection can be reduced by increasing compliance of an adhesive between the glazing and the frame, the compliance being controlled by material stiffness and geometric stiffness of the adhesive. However, increasing adhesive compliance to limit out-of-plane deflection of the glazing to within specifications can adversely affect the structural stiffness of the vehicle, which in turn can affect vehicle acoustic behavior and road holding. A need has developed, therefore to minimize the adverse effect on vehicle torsional stiffness when adhesive compliance is increased to minimize glazing out-of-plane deflection due to differential thermal expansion and contraction.

Another problem arises in that if the adhesive is extruded from a nozzle onto one of the surfaces to be bonded (e.g., the glazing or the frame), there is the potential for variations in adhesive dimensions around the glazing perimeter and the frame. Such variations can strongly affect local in-plane deformation. Allowance for such variability can be made by over-sizing the nominal gap to provide against complete local closure of the gap (e.g., during maximum thermal expansion of the glazing) at any locations susceptible to closure due to variability in adhesive dimensions. However, a large nominal gap undermines the vehicle fit and finish, which is a standard measure of quality. A need has also arisen, therefore, to minimize or eliminate variability in adhesive dimensions so that the gap width can be minimized to avoid an unnecessary compromise in the vehicle's fit and finish.

SUMMARY

In one embodiment, a vehicle component comprises: a thermoplastic element having a thermoplastic element first surface and a thermoplastic element second surface; a structural element defining an opening, wherein the structural element has a structural element first surface and a structural element second surface, wherein the thermoplastic element is in the opening; and an elastic anisotropic bonding element between the thermoplastic element second surface and the structural element first surface.

In one embodiment, a plastic assembly comprises: a thermoplastic element having a thermoplastic element first surface and a thermoplastic element second surface, wherein the thermoplastic element has a first coefficient of thermal expansion; a structural element having a structural element first surface and a structural element second surface, wherein the structural element has a second coefficient of thermal expansion, wherein the first coefficient of thermal expansion and the second coefficient of thermal expansion differ by greater than or equal to 10%; and an anisotropic bonding element comprising elongated members in a matrix, wherein the anisotropic bonding element is located between the thermoplastic element second surface and the structural element first surface.

In one embodiment, a method of forming a plastic assembly comprises: forming an anisotropic bonding element, wherein the anisotropic bonding element comprises a bonding element matrix and elongated members, wherein the elongated members have an elastic modulus that is different from the elastic modulus of the bonding element matrix; assembling a structural element having a structural element first surface and a structural element second surface and a thermoplastic element having a thermoplastic element first surface and a thermoplastic element second surface, wherein the bonding element is located between the structural element first surface and the thermoplastic element second surface.

In one embodiment, a method of forming a plastic assembly comprises: arranging elongated members on a thermoplastic element surface or a structural element surface, wherein the structural element has a structural element first surface and a structural element second surface and the thermoplastic element has a thermoplastic element first surface and a thermoplastic element second surface; overcoating the elongated members with a bonding element matrix to form an anisotropic bonding element; and assembling the plastic assembly, wherein the anisotropic bonding element is located between the thermoplastic element second surface and the structural element first surface.

In one embodiment, a method of forming a plastic assembly comprises: forming an anisotropic bonding element comprising a layer comprising a bonding element matrix without elongated members, a layer comprising a bonding element matrix comprising elongated members, and a layer comprising a bonding element matrix without elongated members; and attaching the anisotropic bonding element to a structural element and a thermoplastic element, wherein the anisotropic bonding element is between a thermoplastic element second surface and a structural element first surface.

In one embodiment, a method of forming a plastic assembly comprises: forming an anisotropic bonding element comprising a layer comprising a bonding element matrix without elongated members, a layer comprising elongated members, and a layer comprising a bonding element matrix without elongated members; and attaching the anisotropic bonding element to a structural element and a thermoplastic element, wherein the anisotropic bonding element is between a thermoplastic element second surface and a structural element first surface.

BRIEF DESCRIPTION OF THE DRAWINGS

The following is a brief description of the drawings, wherein like elements are numbered alike, and which are present for the purposes of illustrating the exemplary embodiments disclosed herein and not for the purposes of limiting the same.

DETAILED DESCRIPTION

Figure 1:
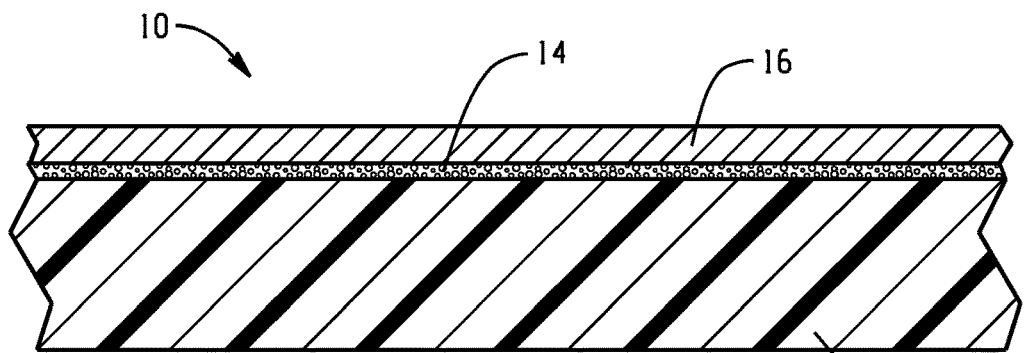
FIG. 1 is a view of a thermoplastic element as described herein.

The plastic assembly using an anisotropic bonding element as disclosed herein can offer an improvement in torsional stiffness of a vehicle for a given compliance (e.g., flexibility) of the bonding element towards thermal expansion of a thermoplastic element in the direction substantially perpendicular to the edge (e.g., perimeter) of the thermoplastic element, or conversely, to improve the compliance for a given torsional stiffness. In other words, use of an anisotropic bonding element in a plastic assembly can effectively decouple the compliance from the torsional stiffness, to enable these attributes to perform their respective functions substantially independently, without an adverse effect on torsional stiffness with an increase in compliance, or without an adverse effect on compliance with an increase in torsional stiffness. An anisotropic bonding element has an intrinsic mechanical response that is different in a first direction versus a second, different direction (e.g., different in a direction perpendicular to a thermoplastic element perimeter and in a direction parallel to the thermoplastic element perimeter). Stated another way, an anisotropic bonding element can have different elastic modulus values for deformations in the first and second directions. For example, the first and the second modulus values can differ by greater than or equal to 20%, specifically, greater than or equal 25%, more specifically, greater than or equal to 35%, and even more specifically, greater than or equal to 50% (e.g., the second modulus can be greater than or equal to 25% larger than the first modulus, wherein the first modulus is for deformations perpendicular to a perimeter of the thermoplastic element).

To address the conflict between thermal expansion compliance and torsional stiffness, the anisotropic bonding element can attach the thermoplastic element to a structural element (e.g., a frame), while simultaneously providing relatively high compliance in a primary direction of thermal expansion (i.e., perpendicular to the thermoplastic element perimeter) and relatively high stiffness in the direction in which stresses, e.g., due to torsion between front and rear axles, can occur in the bonding element (i.e., parallel to the thermoplastic element perimeter). The anisotropic bonding element can help limit out-of-plane deflection to a minimum by deforming when the plastic assembly is exposed to temperature changes, thereby allowing the thermoplastic element to expand and contract as needed. For example, in automotive roof applications, the maximum out-of-plane deflection should remain less than 3% of the largest lateral dimension of the roof glazing, specifically, less than 2%, and more specifically, less than 1%.

The anisotropic bonding element has the ability to enhance stiffness of the plastic assembly in a direction parallel to the thermoplastic element perimeter (e.g., torsional stiffness) while simultaneously preserving the ability of the thermoplastic element to flex in a direction perpendicular to the thermoplastic element perimeter. In one embodiment, the anisotropic bonding element comprises an anisotropic material having a first modulus for deformations in a first orientation direction and a second modulus for deformations in a second orientation direction, wherein the second modulus is greater than or equal to 25% larger than the first modulus.

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Figure 2:
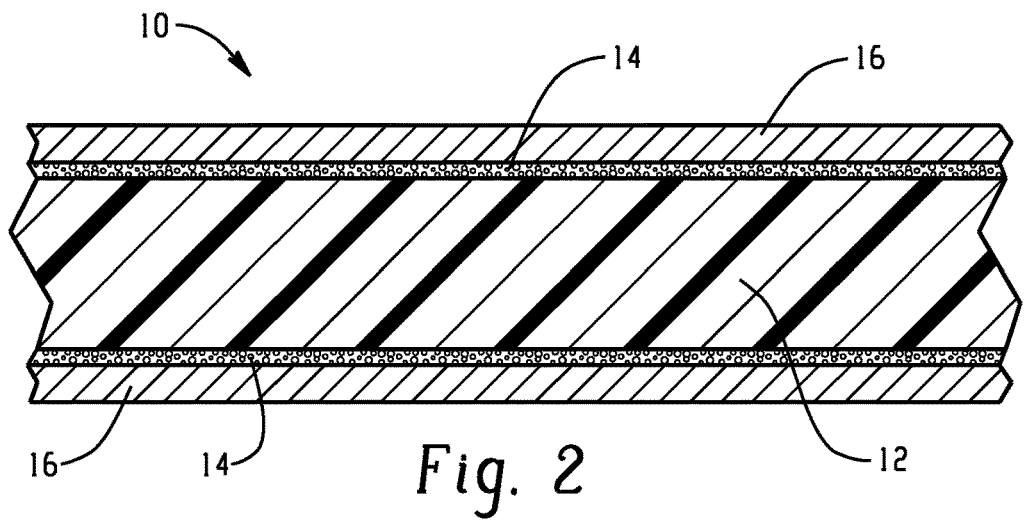
FIG. 2 is a view of a thermoplastic element as described herein.

As illustrated in FIGS. 1 and 2, a glazing 10 (e.g., thermoplastic element 10) can generally comprise a substrate 12, a weathering layer 14 disposed on either or both sides of the substrate 12, e.g., for protection against ultraviolet radiation, and an abrasion resistant layer 16 (e.g., a plasma coating) disposed on either or both sides of the substrate 12, e.g., to protect the substrate 12 from scratches or debris related damage. When the weathering layer 14 and abrasion resistant layer 16 are both present, the weathering layer 14 can be located between the substrate 12 and the abrasion resistant layer 16.

The substrate can comprise a plastic such as polycarbonate resin, acrylic polymers, polyacrylate, polyester, polysulfone resins, as well as combinations comprising at least one of the foregoing. In some embodiments the substrate can comprise an opaque or dark tinted plastic having 5% to 25% visible light transmittance (e.g., rooflite, vehicle body panel applications, vehicle windows, etc.), while in other embodiments, the substrate can comprise a transparent plastic having greater than or equal to 70% visible light transmittance (e.g., front windshield, driver's side window, etc.). Visible light transmittance can be determined in accordance with the American Society for Testing Materials (ASTM) standard D1003-11, Procedure A using Commission Internationale de L'Eclairage (CIE) standard illuminant C (see e.g., International Standards Organization (ISO) 10526). The polycarbonate resins can be aromatic carbonate polymers which may be prepared by reacting dihydric phenol(s) with a carbonate precursor such as phosgene, a haloformate, or a carbonate ester. One example of a polycarbonate which can be used is polycarbonate LEXAN*, commercially available from SABIC Innovative Plastics. The transparent plastic substrate can include bisphenol-A polycarbonate and other resin grades (such as branched or substituted) as well as being copolymerized or blended with other polymers such as polybutylene terephthalate (PBT), poly-(acrylonitrile-butadiene-styrene) (ABS), or polyethylene.

Acrylic polymers can be prepared from monomers such as methyl acrylate, acrylic acid, methacrylic acid, methyl methacrylate, butyl methacrylate, cyclohexyl methacrylate, and the like, as well as combinations comprising at least one of the foregoing. Substituted acrylates and methacrylates, such as hydroxyethyl acrylate, hydroxybutyl acrylate, 2-ethylhexylacrylate, and n-butylacrylate can also be used.

Polyesters can be prepared, for example by the polyesterification of organic polycarboxylic acids (e.g., phthalic acid, hexahydrophthalic acid, adipic acid, maleic acid, terephthalic acid, isophthalic acid, sebacic acid, dodecanedioic acid, and so forth) or their anhydrides with organic polyols containing primary or secondary hydroxyl groups (e.g., ethylene glycol, butylene glycol, neopentyl glycol, and cyclohexanedimethanol).

Polyurethanes are another class of materials which can be used to form the substrate. Polyurethanes can be prepared by the reaction of a polyisocyanate, with a polyol, polyamine, or water. Examples of polyisocyanates include hexamethylene diisocyanate, toluene diisocyanate, diphenylmethane diisocyanate (MDI), isophorone diisocyanate, and biurets and thisocyanurates of these diisocyanates. Examples of polyols include low molecular weight aliphatic polyols, polyester polyols, polyether polyols, fatty alcohols, and the like. Examples of other materials from which the substrate can be formed include acrylonitrile-butadiene-styrene, VALOX* (polybutylenephthalate, commercially available from SABIC Innovative Plastics), XENOY* (a blend of LEXAN* and VALOX*, commercially available from SABIC Innovative Plastics), and the like.

The plastic substrate can further comprise various additives, such as colorant(s), mold release agent(s), antioxidant(s), surfactant(s), plasticizer(s), infrared radiation absorber(s), antistat(s), antibacterial(s), flow additive(s), dispersant(s), compatibilizer(s), ultraviolet radiation absorbers, and combinations comprising at least one of the foregoing.

The substrate can be formed in various manners such as by injection molding, extrusion, cold forming, vacuum forming, compression molding, transfer molding, thermal forming, and so forth. An article may be in any shape and need not be a finished article of commerce, that is, it may be sheet material or film which would be cut or sized or mechanically shaped into a finished article.

A weathering layer (e.g., a coating) can be applied to the substrate, e.g., in a thickness of less than or equal to 100 micrometers (μm), specifically, 4 μm to 65 μm. The weathering layer can be applied by various means, including dipping the plastic substrate in a coating solution at room temperature and atmospheric pressure (i.e., dip coating). The weathering layer can also be applied by other methods including, but not limited to, flow coating, curtain coating, and spray coating. The weathering layer can comprise silicones (e.g., a silicone hard coat), polyurethanes (e.g., polyurethane acrylate), acrylics, polyacrylate (e.g., polymethacrylate, polymethyl methacrylate), polyvinylidene fluoride, polyesters, epoxies, and combinations comprising at least one of the foregoing. The weathering layer 14 can include ultraviolet absorbing molecules (e.g., such as hydroxyphenylthazine, hydroxybenzophenones, hydroxylphenylbenzothazoles, hydroxyphenyltriazines, polyaroylresorcinols, and cyanoacrylate, as well as combinations comprising at least one of the foregoing). For example, the weathering layer can comprise a silicone hard coat layer (AS4000 or AS4700, commercially available from Momentive Performance Materials).

The weathering layer can comprise a primer layer and a coating (e.g., a top coat) to provide a weathering system to the glazing. A primer layer can aid in adhesion of the weathering system to the substrate. The primer layer can include, but is not limited to, acrylics, polyesters, epoxies, and combinations comprising at least one of the foregoing. The primer layer can also include ultraviolet absorbers in addition to or in place of those in the top coat of the weathering layer. For example, the primer layer can comprise an acrylic primer (SHP401 or SHP470, commercially available from Momentive Performance Materials).

The abrasion resistant layer (e.g., a coating, or plasma coating) can comprise a single layer or a multitude of layers and can add enhanced functionality by improving abrasion resistance of the glazing. Generally, the abrasion resistant layer 16 can comprise an organic coating and/or an inorganic coating such as, but not limited to, aluminum oxide, barium fluoride, boron nitride, hafnium oxide, lanthanum fluoride, magnesium fluoride, magnesium oxide, scandium oxide, silicon monoxide, silicon dioxide, silicon nitride, silicon oxy-nitride, silicon carbide, silicon oxy carbide, hydrogenated silicon oxy-carbide, tantalum oxide, titanium oxide, tin oxide, indium tin oxide, yttrium oxide, zinc oxide, zinc selenide, zinc sulfide, zirconium oxide, zirconium titanate, glass, and combinations comprising at least one of the foregoing.

The abrasion resistant layer can be applied by various deposition techniques such as vacuum assisted deposition processes and atmospheric coating processes. For example, vacuum assisted deposition processes can include, but are not limited to, plasma enhanced chemical vapor deposition (PECVD), arc-PECVD, expanding thermal plasma PECVD, ion assisted plasma deposition, magnetron sputtering, electron beam evaporation, and ion beam sputtering, while atmospheric coating processes can include, but are not limited to curtain coating, spray coating, spin coating, dip coating, and flow coating.

Various additives can be added to the primer layer such as colorant(s), antioxidant(s), surfactant(s), plasticizer(s), infrared radiation absorber(s), antistat(s), antibacterial(s), flow additive(s), dispersant(s), compatibilizer(s), cure catalyst(s), ultraviolet radiation absorber(s), and combinations comprising at least one of the foregoing. The type and amounts of any additives added to the various layers depends on the desired performance and end use of the glazing.

Optionally, one or more of the coatings (e.g., weathering layer and/or abrasion resistant layer) can be substituted with a film applied to the substrate by a method such as lamination or film insert molding. The film has spectral properties, either naturally, by virtue of additives it contains, or by virtue of a spectrally selective multi-layer structure carried by the film, that can complement the spectral properties of the substrate and/or any coating(s), generally with their own respective additives. In this case, the coating(s) could be applied to the film and/or to the side of the substrate opposite the side with the film. For example, a co-extruded film, an extrusion coated, a roller-coated, or an extrusion-laminated film comprising greater than one layer can be used as an alternative to a hard coat (e.g., a silicone hard coat) as previously described where the film can act as an adhesion promoting layer. The film can contain an additive or copolymer to promote adhesion of the weatherable layer (i.e., weatherable film) to the abrasion resistant layer, and/or can itself comprise a weatherable material such as an acrylic (e.g., polymethylmethacrylates), fluoropolymer (e.g., polyvinylidene fluoride, polyvinyl fluoride), etc., and/or can block transmission of ultraviolet radiation sufficiently to protect the underlying substrate; and/or can be suitable for film injection molding (FIM), in mold decoration (IMD), extrusion, or lamination processing of a three dimensional shaped panel.

A polycarbonate sub-layer can be co-extruded with, or extrusion laminated to, the weatherable film or another functional layer as a carrier sub-layer. This sub-layer, which can be transparent, can assist in supporting the formation and structure of the weatherable layer or other function layer, as well as optionally promoting melt bonding between the weatherable film and the substrate during film insert molding. The carrier sub-layer can accommodate any mismatch in glass transition temperature (Tg) and coefficient of thermal expansion (CTE) between the substrate and the weatherable film. The polycarbonate used as the carrier sub-layer can support the inclusion of additional functionality, such as a printed black-out/fade-out or defroster and the like, and/or a graphics film and the like.

Isotropic bonding elements can attach vehicle glazing to the vehicle frame. However, isotropic bonding elements have an undesirable tendency to force a choice between providing either adequate torsional stiffness to the plastic assembly or adequately minimizing out of plane deflection of the thermoplastic element (e.g., staying within specifications). Generally, isotropic bonding elements deform to help accommodate differential expansion and contraction between the thermoplastic element and the structural element to which it is attached (e.g., a vehicle frame). To the extent that the isotropic bonding element is allowed to deform laterally (e.g., to minimize out of plane deflection), via greater material and/or geometric compliance, there can be the undesirable tendency to reduce structural (i.e., torsional) stiffness of the vehicle. Moreover, to the extent that cross-sectional dimensions of the isotropic bonding element can vary around the thermoplastic element and structural element (e.g., frame) opening, an increasingly larger nominal gap width is needed. However, such an increase can have an undesirable effect on the perceived vehicle quality (i.e., fit and finish). Thus, there is a conflict between providing torsional stiffness and compliance to thermal expansion of a thermoplastic element with the use of an isotropic bonding element.

A two-phase adhesive system consisting of an outer shell of standard glass glazing adhesive and a core of paste-like material where each phase is a single, continuous element, with good damping characteristics can be used to balance stiffness and acoustic damping between glass glazing and a vehicle frame, but it fails to address the much greater differential thermal expansion between polymeric glazing (e.g., plastic glazing) and the vehicle frame (e.g., metal, carbon fiber, etc. frame).

In vehicular applications, a stiffener can be used to enhance torsional rigidity of a plastic panel, but additional features may be needed to accommodate differential expansion of the panel and the stiffener. For example, in an application where a panel is not attached all around a fixed vehicle roof, an extended part of the panel is sandwiched between a weather strip and the stiffener and moves against a pinching force when the panel expands or contracts. The pinching force is adjusted by the fastening force of a bolt that connects the stiffener to a nut attached to the weather strip and inserted through a guide cylinder erected on the extended part of the panel between the weather strip and the stiffener. Due to the panel not being attached all around the perimeter of a fixed vehicle roof, such a construction fails to even address the torsional stiffness of a vehicle and thus, fails to provide a practical solution to solving the problem of providing torsional stiffness and compliance to thermal expansion of a thermoplastic element.

Figure 3:
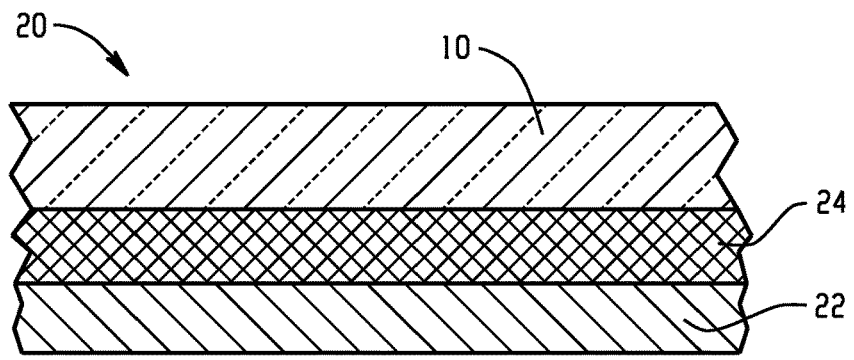
FIG. 3 is a view of a plastic assembly as described herein.

Use of an anisotropic bonding element in a plastic assembly can effectively decouple the compliance (i.e. for deformations that are perpendicular to the thermoplastic element perimeter) from the torsional stiffness, to enable these attributes to perform their respective functions independently, without an adverse effect on torsional stiffness with an increase in compliance and vice versa. As illustrated in FIG. 3, a plastic assembly 20 can comprise a thermoplastic element 10 (e.g., glazing 10) that can be attached to a structural element 22 (e.g., a vehicle frame or a roof frame) via an anisotropic bonding element 24. The structural element 22 can comprise any material that will provide the desired structural integrity to the structure and that has a coefficient of thermal expansion that differs from the coefficient of thermal expansion of the thermoplastic element 10 by greater than or equal to 10% of the coefficient of thermal expansion of the thermoplastic element 10. For example, the structural element 22 can comprise a metal (e.g., aluminum, steel, and so forth), a plastic (e.g., thermoplastic (e.g., carbon fiber reinforced plastic), thermoset, and so forth), and combinations comprising at least one of the foregoing.

The plastic assemblies and vehicle windows disclosed herein comprising an anisotropic bonding element can demonstrate anisotropic elastic behavior, meaning that the bonding element can be relatively compliant (e.g., have a relatively low modulus) for deformations that are perpendicular to the thermoplastic element perimeter (i.e., edge), while the bonding element can be relatively stiff (e.g., have a relatively high modulus) for deformations in the direction parallel to the thermoplastic element perimeter.

The anisotropic bonding element can comprise any material that will improve the torsional stiffness of the vehicle for a given compliance of the anisotropic bonding element toward thermal expansion of the glazing in the direction substantially perpendicular to the edge of the glazing, or conversely to improve the compliance for a given torsional stiffness. For example, the anisotropic bonding element can comprise a composite material comprising a matrix with elongated members (e.g., fibers) embedded therein where the elongated members lend anisotropy to the composite material by virtue of their large aspect ratio (e.g., 10:1), controlled orientation and an elastic modulus that is different from the elastic modulus of the matrix.

Figure 4:
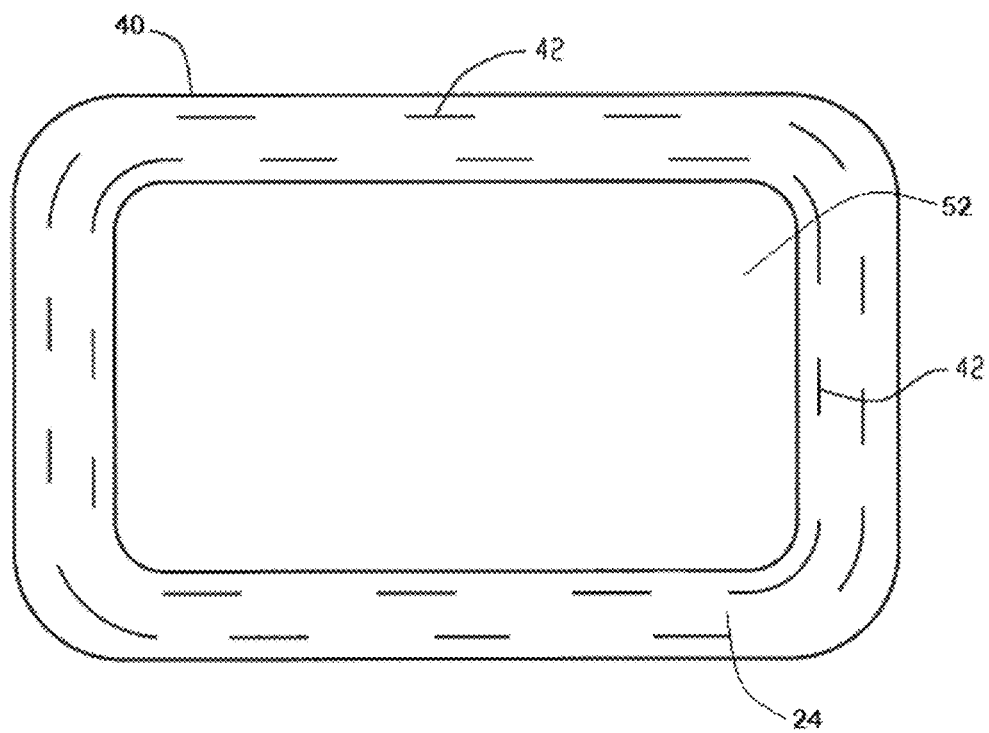
FIG. 4 is a top view of a thermoplastic element of a plastic assembly having elongated members.

Since the anisotropic bonding element does not require special features integral to the thermoplastic element or the structural element to be used, it can be compatible with existing glazing and vehicle designs. For example, the anisotropic bonding element can be disposed between an edge of the thermoplastic element and the structural element such that the elongated members can be parallel to a surface of the thermoplastic element adjacent to which they are located (e.g., the anisotropic bonding element can be located between a structural element first surface and a thermoplastic element second surface). The elongated members can also be substantially parallel to one another and substantially parallel to the thermoplastic element perimeter. For example, as illustrated in FIG. 4, elongated members 42 can be distributed around the thermoplastic element perimeter 40 and oriented substantially parallel to thermoplastic element first surface 50, and/or thermoplastic element second surface 52, and/or structural element first surface 54, as well as substantially parallel to one another and substantially parallel to the thermoplastic element perimeter 40, thereby forming an anisotropic bonding element 24. The anisotropic bonding element 24 can serve several functions such as, adhering the thermoplastic element to the frame and/or providing increased torsional stiffness to the plastic assembly as compared to an isotropic bonding element for a given compliance to thermal expansion of the thermoplastic element and/or providing increased compliance as compared to an isotropic bonding element for a given stiffness. An optional adhesive can also be used for further adhesion between the thermoplastic element and the bonding element and/or between the bonding element and the structural element (e.g., between the thermoplastic element second surface and a bonding element first surface and/or between a bonding element second surface and the structural element first surface).

Figure 5:
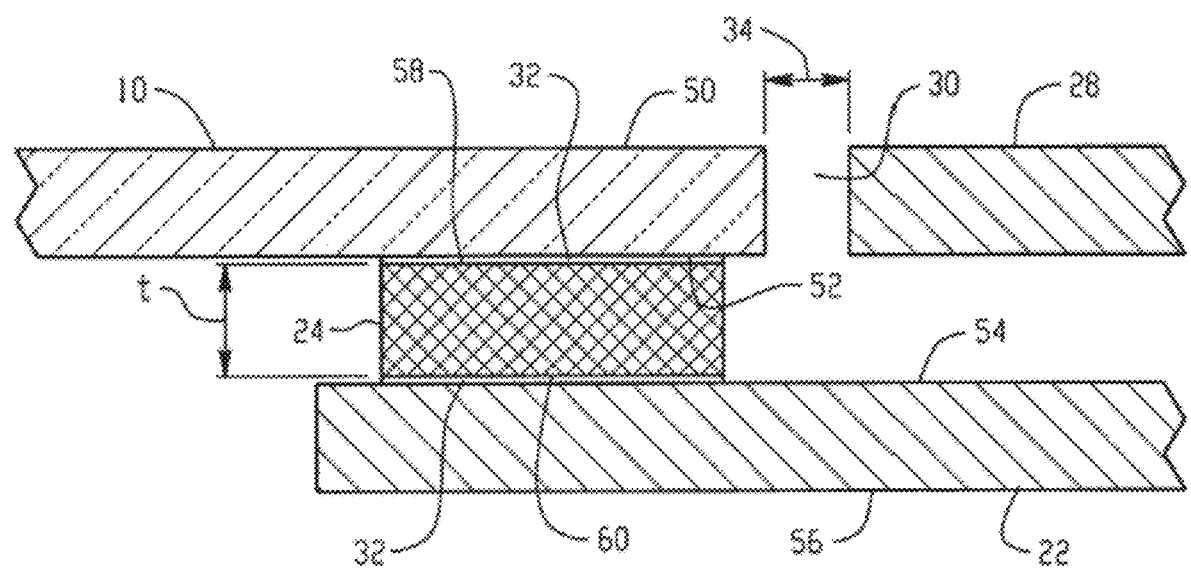
FIG. 5 is a schematic view of a plastic assembly.

As described herein, the elongated members can generally have an aspect ratio (i.e., length to width) of greater than or equal to 10:1 and can be oriented parallel to one another, oriented parallel to the thermoplastic element perimeter, and oriented parallel to the thermoplastic element surface (e.g., thermoplastic element first surface 50 and/or thermoplastic element second surface 52 in FIG. 5). It is to be understood that parallel as referred to herein generally refers to the elongated members being substantially parallel such that greater than or equal to 75% of the elongated members are oriented to within ±45° of one another and/or within ±45° of a portion of the perimeter of the thermoplastic element adjacent to the particular members (see elongated members 42 in FIG. 4). In one embodiment, the anisotropic bonding element comprises a composite material comprising a matrix and elongated members oriented parallel to the thermoplastic element surface (e.g., thermoplastic element first surface 50 in FIG. 5 and/or thermoplastic element second surface 52 in FIG. 5), where the elongated members are stiffer compared to the matrix and where the elongated members 42 are also substantially parallel to one another and to the thermoplastic element perimeter 40. In one embodiment, when the elongated members are stiffer than the matrix, greater than or equal to 75% of the elongated members can be oriented parallel (e.g., substantially parallel, within ±45°, specifically, ±30°) to a portion of the perimeter of the thermoplastic element to which they are adjacent, specifically, greater than or equal to 85%, and more specifically, greater than or equal to 95%. It is to be understood, however, that the elongated members 42 can extend around the thermoplastic element perimeter 40 as illustrated in FIG. 4.

Various methods can be utilized to form the anisotropic bonding element comprising elongated members. In one embodiment, extrusion can be used to embed elongated members into a bonding element matrix where the elongated members are oriented in the desired direction as they exit the extruder (i.e., parallel to the length of the extrudate (the major axis)), to form the anisotropic bonding element. For example, the bonding element matrix (e.g., adhesive) and elongated members can be mixed together and then extruded as a mixture from a common reservoir with the use of a device (e.g., aperture or screen) to impose the desired orientation on the fibers. As another example, the bonding element matrix and elongated members can be extruded (e.g., formed) separately from separate reservoirs and merged after orientation of the elongated members in the desired direction, for example, as the elongated members and bonding element matrix are applied to the structural element. Further, an anisotropic bonding element can be formed by introducing (e.g., merging) properly oriented pre-existing elongated members (e.g., fibers) into a bonding element matrix (e.g., adhesive), e.g., as the matrix is being extruded onto a surface of the thermoplastic element or the structural element, thus forming a composite material.

In another embodiment, the elongated members can be oriented on a surface and then over coated with a bonding element matrix, optionally, with a temporary pair of guides (e.g., two guides) forming a channel that can be open at the top, into which the oriented elongated members, bonding element matrix, and more oriented elongated members on top of the bonding element matrix can be placed. If the elongated members are longer than the spacing between the guides, then guides can optionally be used to help define the orientation of the elongated members and/or to promote the merging of the elongated members and the bonding element matrix.

In another embodiment, to avoid having elongated members directly in contact with either surface of the plastic assembly (e.g., the thermoplastic element or the structural element), alternating layers of the bonding element matrix not comprising the elongated members and layers of the bonding element matrix comprising elongated members can be made such that the anisotropic bonding element comprises a bonding element matrix layer not comprising the elongated members on either surface that will contact the thermoplastic element and the structural element. For example, the anisotropic bonding element can comprise a layer of a bonding element matrix not comprising the elongated members, followed by a layer of a bonding element matrix comprising elongated members, followed by a layer of a bonding element matrix not comprising the elongated members (e.g., a sandwich composite). In an alternative construction, the anisotropic bonding element can comprise a layer of a bonding element matrix not comprising the elongated members, following by a layer comprising oriented elongated members, followed by a layer of a bonding element matrix not comprising the elongated members (e.g., a sandwich composite). It is to be understood that any number of layers can be used to form the sandwich composites and is not limited to that described herein.

It is to be understood that the guides can be used in any of the embodiments described herein to form the anisotropic bonding element and/or to the shape the anisotropic bonding element e.g., to promote uniformity of the anisotropic bonding element dimensions around the thermoplastic element perimeter. The optional guides can be removed before the anisotropic bonding element sets (e.g., cures), and contact of the anisotropic bonding element can then be made with the other surface to be joined.

In another embodiment, to minimize the adverse effect on vehicle torsional stiffness when bonding element compliance is increased and/or to minimize the nominal gap width (e.g., such that under maximum thermal expansion conditions, the gap width is maintained at a minimum gap width of about 1 mm) that may have to be oversized when bonding element cross-sectional dimensions are not well controlled, the anisotropic bonding element can comprise a solid composite material before attachment to the structural element, frame, glazing, thermoplastic element, etc. The use of a solid composite material as the bonding element before attachment to the structural element can provide overall uniform bonding, i.e., uniform compliance around the perimeter, thereby promoting a uniform change in the gap width around the perimeter, of the thermoplastic element to the structural element because the solid composite material bonding element can have uniform cross-sectional dimensions around the thermoplastic element perimeter. For example, if the solid composite material comprises a tape, it can be pre-measured and cut to the desired size so that the cross-sectional dimensions are uniform throughout meaning that when it is used to attach the thermoplastic element to the structural element, there is uniform compliance throughout. In another embodiment, the solid composite material bonding element can comprise a curable material (e.g., a liquid room temperature vulcanize filling (RTV) (e.g., silicone RTV), a rubber or thermoset elastomer (TSE) (e.g., silicone TSE), etc.) that be fully cured or partially cured before attachment to the structural element. The bonding element can have a thickness of 1 mm to 10 mm, specifically, 2 mm to 8 mm, and more specifically, 3 mm to 6 mm.

Uniform bonding, i.e., the cross-sectional dimensions of the anisotropic bonding element and its placement relative to the edge of the thermoplastic element, by virtue of the bonding element being pre-formed with a uniform cross-section, thereby promoting uniform compliance in the direction perpendicular to the edge, will thus minimize the nominal gap width, i.e., will allow the gap width to be minimized by design. The anisotropic bonding element as a solid composite material can have elastic properties in the direction perpendicular to the perimeter of the thermoplastic element which, combined with its cross-sectional dimensions, accommodate differential thermal expansion between the thermoplastic element and the structural element so as to maintain out-of-plane deflection within specifications at the maximum temperature to which the plastic assembly is exposed. As a solid composite, the anisotropic bonding element can be formed with relatively uniform cross-sectional dimensions so that when placed between a thermoplastic plastic element and a structural element, the anisotropic bonding element can provide uniform compliance around the perimeter of the thermoplastic element perimeter to provide uniform movement when the assembly is subjected to changes in temperature that would cause the thermoplastic element to expand or contract. Additionally, whether fully cured or partially cured before attachment to a thermoplastic element or a structural element, the solid composite material bonding element can be more controllably positioned than a bonding element extruded directly onto the thermoplastic element or the structural element and subsequently pressed during formation of the plastic assembly.

Stated another way, the anisotropic bonding element can comprise a solid material to help reduce variation in cross-sectional dimensions and placement (relative to the edge of the thermoplastic element and/or structural element) of the bonding element. A solid anisotropic bonding element can be used also to maintain a relatively uniform gap width around the thermoplastic element perimeter and the structural element opening as the thermoplastic element expands and/or contracts as temperature changes, and thus can allow the gap width to be minimized by design while avoiding local gap closure under maximum thermal expansion of the thermoplastic element. In this embodiment, the anisotropic bonding element can be preformed as previously described with the elongated members embedded in the anisotropic bonding element. The solid anisotropic bonding element can be fully or partially cured before attachment to the thermoplastic element and the structural element. In the case of a partial cure before attachment, the bonding element can finish curing once attached to the thermoplastic element and the structural element. In preparation for attaching the thermoplastic element to the structural element, the anisotropic bonding element can be initially adhered to either the structural element or the thermoplastic element.

Further adhesion between the anisotropic bonding element and the thermoplastic element and/or the structural element, can be attained with the optional use of an adhesive (see adhesive 32 in FIG. 5). The adhesive can contribute to the compliance of the plastic assembly. The anisotropic bonding element and/or the adhesive can also contribute to efficient damping for vehicle acoustic performance. In order to accommodate the solid bonding element (e.g., a fully cured solid bonding element), the adhesive can have a thickness of less than or equal to 1 mm, specifically, less than or equal to 0.5 mm. The adhesive can also have a thickness of 0.1 mm to 0.9 mm. In one embodiment, e.g., in glazing, the adhesive can extend around the perimeter of the glazing between the glazing and the anisotropic bonding element and/or between the structural element and the anisotropic bonding element, to provide a barrier against noise, moisture, etc. The adhesive can comprise, for example, in one embodiment, double sided tape.

The elongated members can comprise materials having an aspect ratio of greater than 1000:1, specifically 100:1, and more specifically 10:1. For example, the elongated members can be fibers, e.g., processed mineral fibers, such as those derived from blends comprising at least one of aluminum silicates, aluminum oxides, magnesium oxides, and calcium sulfate hemihydrate; natural fibers including wood flour, cellulose, cotton, sisal, jute, starch, cork flour, lignin, ground nut shells, corn, rice grain husks; synthetic reinforcing fibers, including polyester fibers such as polyethylene terephthalate fibers, polybutylene terephthalate and other polyester fibers, polyvinyl alcohol fibers, polybenzimidazole fibers, polyimide fibers such as polyimide 2080 and PBZ fiber (both products of Dow Chemical Company), polyphenylene sulfide fibers, polyether ether ketone fibers, polyarylates, polyethylene, polytetrafluoroethylene, acrylic resins, high tenacity fibers with high thermal stability including aromatic polyamides, polyaramid fibers such as Kevlar (product of Du Pont), polybenzimidazole, polyphenylene sulfide, polybenzoxazole, and combinations comprising at least one of the foregoing; boron fibers; ceramic fibers such as silicon carbide, fibers from mixed oxides of aluminum, boron and silicon; single crystal fibers or "whiskers" including silicon carbide fibers, alumina fibers, boron carbide fibers, iron fibers, nickel fibers, copper fibers; glass fibers, including textile glass fibers such as E, A, C, ECR, R, S, D, and NE glasses, and quartz; basalt fibers; carbon fibers or vapor-grown carbon fibers; as well as combinations comprising at least one of the foregoing.

The carbon fibers include those having an average diameter of about 3.5 to about 500 nanometers as described in, for example, U.S. Pat. Nos. 4,565,684 and 5,024,818 to Tibbetts et al., U.S. Pat. No. 4,572,813 to Arakawa; U.S. Pat. Nos. 4,663,230 and 5,165,909 to Tennent, U.S. Pat. No. 4,816, 289 to Komatsu et al., U.S. Pat. No. 4,876,078 to Arakawa et al., U.S. Pat. No. 5,589,152 to Tennent et al., and U.S. Pat. No. 5,591,382 to Nahass et al.; and the like. Non-limiting examples of fibrous fillers include inorganic fibers, including processed mineral fibers such as those derived from blends comprising at least one of aluminum silicates, aluminum oxides, magnesium oxides, and calcium sulfate hemihydrate, boron fibers, ceramic fibers such as silicon carbide, and fibers from mixed oxides of aluminum, boron and silicon sold under the trade name NEXTEL* by 3M Co., St. Paul, Minn., USA. Also included are natural organic fibers, including wood flour obtained by pulverizing wood, and fibrous products such as cellulose, cotton, sisal, jute, cloth, hemp cloth, felt, and natural cellulosic fabrics such as Kraft paper, cotton paper and glass fiber containing paper, starch, cork flour, lignin, ground nut shells, corn, rice grain husks and mixtures comprising at least one of the foregoing.

Commercially produced glass fibers generally have nominal filament diameters of about 4.0 to about 35.0 micrometers, and most commonly produced lime-aluminum borosilicate glass that is soda-free (E-glass) fibers (e.g.,) have nominal filament diameters of about 9.0 to about 30.0 micrometers can be used. The filaments can be made by processes such as steam or air blowing, flame blowing, and mechanical pulling. The glass fibers may be sized or unsized, wherein sizing generally refers to coating the glass fibers with a suitable composition. For example, sized glass fibers can be coated on at least a portion of their surfaces with a sizing composition selected for compatibility with the bonding element matrix. The sizing composition facilitates wet-out and wet-through of the matrix material upon the fiber strands and assists in attaining desired physical properties in the bonding element material. More specifically, the sizing composition helps to protect the glass fibers for processing and helps to ensure proper bonding to the bonding element matrix, thereby allowing for transfer of shear loads from the glass fibers to the matrix.

Figure 6:
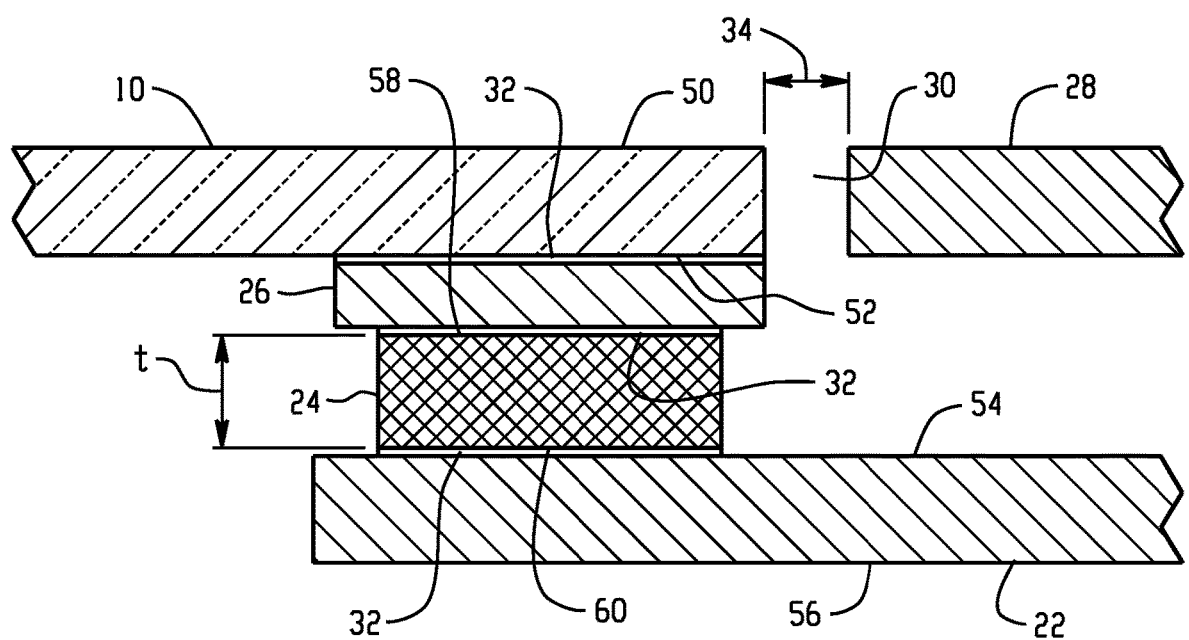
FIG. 6 is a schematic view of another plastic assembly.

As illustrated in FIG. 5, the thermoplastic element 10 can be attached to a structural element 22 with an anisotropic bonding element 24. As also illustrated in FIG. 5, thermoplastic element 10 can have a thermoplastic element first surface 50 and a thermoplastic element second surface 52; structural element 22 can have a structural element first surface 54 and a structural element second surface 56; and bonding element 24 can have a bonding element first surface 58 and a bonding element second surface 60. The bonding element can be located between the thermoplastic element second surface 52 and the structural element first surface 54. FIG. 6 illustrates an embodiment where an optional stiffener 26 can be used to help attach the thermoplastic element 10 to the structural element 22. As illustrated in FIG. 6, the optional stiffener 26 can be located between the thermoplastic element 10 and the anisotropic element 24.

If present, the stiffener 26 can, optionally, be disposed between the thermoplastic element second surface 52 and the anisotropic bonding element first surface 58 and/or between the structural element first surface 54 and the anisotropic bonding element second surface 60. The stiffener 26 can provide additional torsional stiffness to the overall structure. Generally, the stiffener 26 can be a discrete element having intrinsic mechanical properties that have an influence on the elastic behavior of the overall system. The stiffener 26 generally has a greater stiffness compared to the glazing (e.g., is more rigid). In one embodiment, the stiffener 26 can comprise a material such as metal. For example, the stiffener 26 can be a metal plate (e.g., a steel plate). The stiffener 26 can have a width of 25 millimeters (mm) to 100 mm, specifically, 30 mm to 75 mm, more specifically, 35 mm to 70 mm, and even more specifically, 45 mm to 60 mm, and a thickness of 1.0 mm to 5.0 mm, specifically, 1.5 mm to 4 mm, and more specifically, 2.0 mm to 3.5 mm.

As previously discussed, and as illustrated in FIG. 5, a gap 30 can be present between the thermoplastic element 10 and the structural element outer component 28 to accommodate in-plane deformation of the thermoplastic element 10. Gap 30 can accommodate differential expansion of the thermoplastic element 10 and the structural element outer component 28. Due to the optional solid anisotropic bonding element that allows uniform bonding element dimensions around the perimeter, use of an anisotropic bonding element 24 can allow the gap width 34 to remain at a level that does not compromise the appearance of the vehicle fit and finish. The thickness "t" of the anisotropic bonding element 24 is also illustrated in FIG. 5.

The plastic assemblies disclosed herein can be used to form articles in any application that experiences differential thermal expansion, including, but not limited to, glazing (e.g., windshield, rooflite, rear window, side window, quarter window, rear quarter window, spoiler, etc.), body panels, lighting modules, buildings, stadiums, windows (e.g., buildings, houses, etc.), etc., and so forth.

In one embodiment, a vehicle component comprises: a thermoplastic element having a thermoplastic element first surface and a thermoplastic element second surface; a structural element defining an opening, wherein the structural element has a structural element first surface and a structural element second surface, wherein the thermoplastic element is in the opening; and an elastic anisotropic bonding element between the thermoplastic element second surface and the structural element first surface.

In one embodiment, a plastic assembly comprises: a thermoplastic element having a thermoplastic element first surface and a thermoplastic element second surface, wherein the thermoplastic element has a first coefficient of thermal expansion; a structural element having a structural element first surface and a structural element second surface, wherein the structural element has a second coefficient of thermal expansion, wherein the first coefficient of thermal expansion and the second coefficient of thermal expansion differ by greater than or equal to 10%; and an anisotropic bonding element comprising elongated members in a matrix, wherein the anisotropic bonding element is located between the thermoplastic element second surface and the structural element first surface.

In one embodiment, a method of forming a plastic assembly comprises: forming an anisotropic bonding element, wherein the anisotropic bonding element comprises a bonding element matrix and elongated members, wherein the elongated members have an elastic modulus that is different from an elastic modulus of the bonding element matrix; assembling a structural element having a structural element first surface and a structural element second surface and a thermoplastic element having a thermoplastic element first surface and a thermoplastic element second surface, wherein the bonding element is located between the structural element first surface and the thermoplastic element second surface.

In one embodiment, a method of forming a plastic assembly comprises: arranging elongated members on a thermoplastic element surface or a structural element surface, wherein the structural element has a structural element first surface and a structural element second surface and the thermoplastic element has a thermoplastic element first surface and a thermoplastic element second surface; overcoating the elongated members with a bonding element matrix to form an anisotropic bonding element; and assembling the plastic assembly, wherein the anisotropic bonding element is located between the thermoplastic element second surface and the structural element first surface.

In one embodiment, a method of forming a plastic assembly comprises: forming an anisotropic bonding element comprising a layer comprising a bonding element matrix without elongated members, a layer comprising a bonding element matrix comprising elongated members, and a layer comprising a bonding element matrix without elongated members; and attaching the anisotropic bonding element to a structural element and a thermoplastic element, wherein the anisotropic bonding element is between a thermoplastic element second surface and a structural element first surface.

In one embodiment, a method of forming a plastic assembly comprises: forming an anisotropic bonding element comprising a layer comprising a bonding element matrix without elongated members, a layer comprising elongated members, and a layer comprising a bonding element matrix without elongated members; and attaching the anisotropic bonding element to a structural element and a thermoplastic element, wherein the anisotropic bonding element is between a thermoplastic element second surface and a structural element first surface.

In the various embodiments, (i) the anisotropic bonding element has a first elastic modulus for deformations in a first orientation direction and a second elastic modulus for deformations in a second orientation direction, wherein the second modulus is greater than or equal to 25% larger than the first modulus; and/or (ii) the first modulus is for deformations perpendicular to a perimeter of the thermoplastic element; and/or (iii) the thermoplastic element is selected from the group consisting of a windshield, a rooflite, a rear window, a side window, a quarter window, a rear quarter window, a spoiler, a body panel, and combinations comprising at least one of the foregoing; and/or (iv) the anisotropic bonding element comprises a solid composite material before attaching the thermoplastic element to the structural element; and/or (v) an adhesive between the thermoplastic element second surface and a bonding element first surface and/or between a bonding element second surface and the structural element first surface; and/or (vi) the elongated members comprise fibers; and/or (vii) wherein the thermoplastic element comprises polycarbonate; and/or (viii) an article comprises the plastic assembly; and/or (ix) the assembly is selected from the group consisting of glazing, lighting modules, body panels, rooflites, buildings, stadiums, windows, and combinations comprising at least one of the foregoing; and/or (x) the elastic modulus of the elongated members is greater than the elastic modulus of the bonding element matrix; and/or (xi) forming the bonding element further comprises mixing the bonding element matrix and the elongated members to form a mixture; and extruding the mixture from a common reservoir; and/or (xii) forming the bonding element further comprises extruding the bonding element matrix and providing the elongated members from a separate source; orienting the elongated members; and merging the bonding element matrix and the oriented elongated members as they are assembled to the structural element and/or the thermoplastic element; and/or (xiii) forming an open channel with a pair of guides, wherein the guides define the orientation of the elongated members; and/or (xiv) forming an open channel with a pair of guides, wherein the guides define the orientation of the elongated members and/or provide alignment of the layers.

All ranges disclosed herein are inclusive of the endpoints, and the endpoints are independently combinable with each other (e.g., ranges of "less than or equal to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A vehicle component, comprising:
    a thermoplastic element having a thermoplastic element first surface and a thermoplastic element second surface, wherein the thermoplastic element has a first coefficient of thermal expansion;
    a structural element defining an opening, wherein the structural element has a structural element first surface and a structural element second surface, wherein the thermoplastic element is in the opening, wherein the structural element has a second coefficient of thermal expansion, wherein the first coefficient of thermal expansion and the second coefficient of thermal expansion differ by greater than or equal to 10%; and
    an elastic anisotropic bonding element comprising elongated members in a matrix;
    wherein the structural element includes the opening defined by a perimeter; wherein the bonding element is located on the structural element first surface and surrounding the opening forming a frame region;
    wherein the thermoplastic element second surface of the thermoplastic element is bonded to the structural element first surface of the structural element via the elastic anisotropic bonding element and wherein the thermoplastic element spans the opening of the structural element;
    wherein greater than or equal to 75% of the elongated members are oriented substantially parallel to within ±45° of a portion of the perimeter of the thermoplastic element to which the particular members are adjacent.

2. The vehicle component of claim 1, wherein the anisotropic bonding element has a first elastic modulus for deformations in a first orientation direction and a second elastic modulus for deformations in a second orientation direction, wherein the second modulus is greater than or equal to 25% larger than the first modulus.

3. The vehicle component of claim 2, wherein the first elastic modulus is for deformations perpendicular to a perimeter of the thermoplastic element.

4. A plastic assembly, comprising:
a thermoplastic element comprising a substrate, wherein the thermoplastic element has a thermoplastic element first surface and a thermoplastic element second surface, wherein the thermoplastic element has a first coefficient of thermal expansion;
a structural element having a structural element first surface and a structural element second surface, wherein the structural element has a second coefficient of thermal expansion, wherein the first coefficient of thermal expansion and the second coefficient of thermal expansion differ by greater than or equal to 10%; and
an elastic anisotropic bonding element comprising elongated members in a matrix, wherein the structural element includes an opening defined by a perimeter; wherein the elastic anisotropic bonding element is located on the structural element first surface and surrounding the opening forming a frame region;
wherein the thermoplastic element second surface of the thermoplastic element is bonded to the structural element first surface of the structural element via the elastic anisotropic bonding element and wherein the thermoplastic element spans the opening of the structural element;
wherein greater than or equal to 75% of the elongated members are oriented substantially parallel to within ±45° of a portion of the perimeter of the thermoplastic element to which the elongated members are adjacent.

5. The plastic assembly of claim 4, wherein the elastic anisotropic bonding element comprises a solid composite material before attaching the thermoplastic element to the structural element.

6. The plastic assembly of claim 4, further comprising an adhesive between the thermoplastic element second surface and a bonding element first surface and/or between a bonding element second surface and the structural element first surface.

7. The plastic assembly of claim 4, wherein the elongated members comprise fibers.

8. The plastic assembly of claim 4, wherein the thermoplastic element comprises polycarbonate.

9. An article made from the plastic assembly of claim 4.

10. The article of claim 9, wherein the article is a glazing, a lighting module, a body panel, a rooflite, a building, a stadium, a window, or a combination comprising at least one of the foregoing.

11. The plastic assembly of claim 4, wherein the structural element comprises a material selected from metal, plastic, thermoset, or a combination comprising at least one of the foregoing, wherein the plastic comprises a different plastic material than the thermoplastic element.

12. The plastic assembly of claim 11, wherein the structural element comprises a metal selected from aluminum or steel, a plastic material comprising carbon fiber or glass reinforcement, or a combination comprising at least one of the foregoing.

13. The plastic assembly of claim 4, wherein the elastic anisotropic bonding element has a first elastic modulus for deformations in a first orientation direction and a second elastic modulus for deformations in a second orientation direction, wherein the second modulus is greater than or equal to 25% larger than the first modulus.

14. The plastic assembly of claim 13, wherein the first elastic modulus is for deformations perpendicular to a perimeter of the thermoplastic element.

15. The plastic assembly of claim 4, wherein the elongated members are substantially parallel to one another.

16. The plastic assembly of claim 4, wherein the elongated members are substantially parallel to a perimeter of the thermoplastic element.

17. The plastic assembly of claim 4, wherein the elongated members are substantially parallel to the thermoplastic element first surface, and/or the thermoplastic element second surface, and/or the structural element first surface and/or a perimeter of the thermoplastic element.

18. The plastic assembly of claim 4, wherein the substrate comprises a transparent plastic having greater than or equal to 70% visible light transmittance measured according to ASTM D1003-11.

19. The plastic assembly of claim 4, wherein the elongate members are oriented locally parallel to the perimeter.

20. The plastic assembly of claim 4, wherein the elongated members are disposed in a circuit along the perimeter of the thermoplastic element.

21. A plastic assembly, comprising:
a thermoplastic element comprising a polycarbonate substrate, wherein the thermoplastic element has a thermoplastic element first surface and a thermoplastic element second surface, wherein the thermoplastic element has a first coefficient of thermal expansion;
a structural element having a structural element first surface and a structural element second surface, wherein the structural element has a second coefficient of thermal expansion, wherein the first coefficient of thermal expansion and the second coefficient of thermal expansion differ by greater than or equal to 10%; and
an elastic anisotropic bonding element comprising elongated members in a matrix;
wherein the structural element includes an opening defined by a perimeter; wherein the elastic anisotropic bonding element is located on the structural element first surface and surrounding the opening forming a frame region;
wherein the thermoplastic element second surface of the thermoplastic element is bonded to the structural element first surface of the structural element via the elastic anisotropic bonding element and wherein the thermoplastic element spans the opening of the structural element;
wherein greater than or equal to 75% of the elongated members are oriented substantially parallel to within ±45° of a portion of the perimeter of the thermoplastic element to which the elongated members are adjacent;
wherein the substrate comprises a transparent plastic having greater than or equal to 70% visible light transmittance measured according to ASTM D1003-11.

22. A method of forming a plastic assembly, comprising:
forming an anisotropic bonding element, wherein the anisotropic bonding element comprises a bonding element matrix and elongated members, wherein the elongated members have an elastic modulus that is different from an elastic modulus of the bonding element matrix;
assembling a structural element having a structural element first surface and a structural element second surface and a thermoplastic element having a thermoplastic element first surface and a thermoplastic element second surface, wherein the bonding element is located between the structural element first surface and the thermoplastic element second surface;

wherein a first coefficient of thermal expansion of the thermoplastic element and a second coefficient of thermal expansion of the structural element differ by greater than or equal to 10%;

wherein the structural element includes an opening defined by a perimeter; wherein the bonding element is located on the structural element first surface and surrounding the opening forming a frame region;

wherein the thermoplastic element second surface of the thermoplastic element is bonded to the structural element first surface of the structural element via the bonding element and wherein the thermoplastic element spans the opening of the structural element;

wherein greater than or equal to 75% of the elongated members are oriented substantially parallel to within ±45° of a portion of the perimeter of the thermoplastic element to which the elongated members are adjacent.

23. A method of forming a plastic assembly, comprising:

forming an anisotropic bonding element comprising a layer comprising a bonding element matrix without elongated members, a layer comprising a bonding element matrix comprising elongated members, and a layer comprising a bonding element matrix without elongated members; and attaching the anisotropic bonding element to a structural element and a thermoplastic element, wherein the anisotropic bonding element is between a thermoplastic element second surface and a structural element first surface;

wherein a first coefficient of thermal expansion of the thermoplastic element and a second coefficient of thermal expansion of the structural element differ by greater than or equal to 10%;

wherein the structural element includes an opening defined by a perimeter; wherein the elastic anisotropic bonding element is located on the structural element first surface and surrounding the opening forming a frame region;

wherein the thermoplastic element second surface of the thermoplastic element is bonded to the structural element first surface of the structural element via the elastic anisotropic bonding element and wherein the thermoplastic element spans the opening of the structural element;

wherein greater than or equal to 75% of the elongated members are oriented substantially parallel to within ±45° of a portion of the perimeter of the thermoplastic element to which the elongated members are adjacent.

* * * * *